(12) United States Patent
Gnad et al.

(10) Patent No.: US 6,617,447 B2
(45) Date of Patent: Sep. 9, 2003

(54) CONTINUOUS OXIDIZED STARCH PROCESS

(75) Inventors: Tanja Gnad, Davenport, IA (US); James McClain, Davenport, IA (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 09/986,396

(22) Filed: Nov. 8, 2001

(65) Prior Publication Data

US 2003/0088089 A1 May 8, 2003

(51) Int. Cl.$^7$ .................. C08B 31/18; C08B 33/08; C08B 35/08; C01B 11/06
(52) U.S. Cl. .................. 536/105; 536/102; 536/124; 536/123.1; 423/473; 127/71
(58) Field of Search ................ 536/105, 102, 536/124, 123.1; 127/71; 423/473

(56) References Cited

U.S. PATENT DOCUMENTS

| 3,450,692 A | * | 6/1969 | Hyldon et al. |
| 4,146,515 A | | 3/1979 | Buikema et al. |
| 4,373,099 A | | 2/1983 | Hubbard et al. |
| 5,833,755 A | | 11/1998 | Schlom et al. |
| 6,008,345 A | | 12/1999 | Dannoue et al. |
| 6,322,632 B1 | | 11/2001 | McClain |

OTHER PUBLICATIONS

Radley, J.A., "Chapter 20.2: Oxidesed Starch", *Starch Production Technology* (1976) pp. 457–467, Applied Science Publishers LTD: Essex, England.

Levenspeil, O., "Chapter 4: Introduction to Reactor Design", *Chemical Reaction: 2nd Ed.* (1972) pp. 93–95; Wiley & Sons, Inc; USA.

* cited by examiner

*Primary Examiner*—Samuel Barts
*Assistant Examiner*—Michael C. Henry
(74) *Attorney, Agent, or Firm*—Sterne, Kessler, Goldstein & Fox P.L.L.C.

(57) ABSTRACT

The present invention relates to a method of starch production using continuous oxidation. This method allows for the starting material to contain variable amounts of non-starch products, which is common in large-scale processes. This method produces consistently oxidized starch products that exhibit a reduced tendency to form amylose crystals. Using this continuous reactor with multiple stages, it is possible to produce oxidized starch at any given viscosity.

10 Claims, No Drawings

CONTINUOUS OXIDIZED STARCH PROCESS

FIELD OF THE INVENTION

The present invention relates to a method of starch production. More particularly, the present invention relates to a method of starch production using continuous oxidation.

BACKGROUND OF THE INVENTION

Starch has a number of unique properties that make it useful in a variety of applications. One of starch's important properties is its ability to form a viscous fluid from aqueous slurry upon application of energy, typically in the form of heat (i.e., "cooking"). The viscous fluid can be used in food products as a thickener or applied to substances such as paper and textiles whereby it increases the stiffness and abrasion resistance of the material. Another useful property of starch is that dried starch granules are relatively free flowing and can be stored for extended time and/or easy transport to the location where the starch is to be used. Additionally, chemical modifications to the starch can be performed while it is in the granular form. After modification, it can be stored dry for extended periods.

In nature, starch is typically found in the granular form and is obtained from many different plant sources including, but not limited to corn, wheat, potato, and tapioca. Obtaining the starch granules from these plant sources requires separating the starch granules from the non-starch components such as protein, hulls, skin, germ, etc. The separation process is not 100% effective so that small amounts of non-starch material contained in the starch remain. Additionally, because it is derived from natural sources, there is an inherent variation in the concentration of starch granules and non-starch components in the source plant material. These variations can be attributed to factors such as the particular strain of plant, the growing conditions, the soil, etc.

Typically, when designing a starch separation process, a manufacturer will use a representative value for the non-starch components. However, because the concentration in the source plant material will have variations, the final starch will also have small variations in the unwanted components. While it would be possible to design a system to account for the natural variations in the feed material and which would eliminate almost all non-starch components, an appreciable amount of starch would be lost with the non-starch components. These non-starch components can be of less or greater value than the starch. Thus, the design of a starch separation system is to create a balance between eliminating as much of the non-starch components while maximizing the retention of starch components.

For some applications, the variation in concentration for non-starch components in starch will have negligible effect on the final product. These are typically applications where dried starch granules are the end product. For example, the concentration of protein in cornstarch will have only a minor effect on the starch used in body powders (provided that the protein level is relatively small). However, there are many applications where the concentrations of non-starch components will have pronounced effect on the final product. In these applications, the starch is usually cooked before its use. An example of one sensitive application is in oxidized starch. In the manufacture of oxidized starch the protein level will have a significant effect on the starch reaction and the subsequent viscosity of the cooked product made from the starch.

To further complicate the issue, in many of these sensitive starch applications, the cooked starch is required to have a specific viscosity range. A specific viscosity is needed in many applications because one wants the fluid to be thin enough that it is easily handled but not too thin that it overly penetrates the substrate or is slung from the mixer, etc. In a similar vein, one does not want to use a product that is too thick and therefore difficult to pump and spread. For example, in certain paper sizing applications one may want a low viscosity starch to promote penetration into the paper. Conversely, a paperboard manufacturer may want a high viscosity product so that starch stays close to the surface whereby it increases the stiffness of the paperboard.

A starch manufacturer can affect the viscosity of the cooked starch by treating the uncooked starch granules with chemicals. These chemicals include, but are not limited to, hydrochloric acid, sodium hypochlorite, and calcium hypochlorite. Typically, the drop in cooked starch viscosity is proportional to the amount of added chemical. For example adding a large amount of sodium hypochlorite to aqueous slurry of starch granules results in a less viscous cooked starch paste.

In the preceding paragraphs, reference is made to an "oxidized" starch. Oxidized starch is made by reacting starch with an oxidant, thereby forming carboxyl and carbonyl groups on the starch molecule. These carboxyl and carbonyl groups keep adjacent molecules in cooked starch pastes from getting into close proximity and thus hinder the tendency for the starch to coalesce into crystals. Another way to hinder the tendency for the starch to coalesce is to maintain a high cooked paste pH. For many applications, the starch crystals are unwanted because they have a detrimental effect on the cooked starch properties. In addition to forming carboxyl and carbonyl groups on the starch molecule, the oxidant can reduce the length of the starch molecule thereby lowering the viscosity of the product. A description of oxidized starch manufacture can be found in numerous publications and patents (U.S. Pat. No. 4,146,515, and Radley, J. A., *Starch Production Technology*, Applied Science Publisher LTD, London, pg. 457–466).

Please note that in this discussion of oxidized starch production, we are only concerned with reactions involving uncooked starch granules and are not concerned with the oxidation reaction of cooked starches.

Industrially, oxidized starch is produced in a "batch" reactor, i.e., starch is placed in a vessel along with the oxidant, typically sodium hypochlorite, and then the vessel is agitated for a fixed time. At the end of this time the oxidant is neutralized, typically with a sulfite compound, and the starch is further processed by washing, drying, etc. An example of the art of producing an uncooked oxidized starch via the batch process is found on page 464 of Radley, J. A., *Starch Production Technology*, Applied Science Publisher LTD, London. A further discussion of batch reactors can be found in Levenspiel, O., *Chemical Reaction Engineering, Second Edition*, John Wiley and Sons, New York, 1972.

In the industrial production of oxidized starch, the amount of sodium hypochlorite added to the batch is not a fixed amount but instead varies depending on a number of factors including temperature of the reactor and the concentration of non-starch components. Typically in a production facility, they will have a "target" amount of oxidant from which the amount of oxidant to be added is adjusted based upon the results of the immediately preceding batch. This technique is known as "feedback" control. By using batch reactors, a starch producer has flexibility in his production process.

This flexibility allows a starch producer to react to changes in source material and make the appropriate modifications in oxidant dosages.

As stated above, batch reactors have a number of advantages including low initial costs and flexibility of operation. However, they have a tendency to produce an inconsistent product because each batch is run under different specifications. These specifications are determined by the feedback control system earlier described. Additionally, the variation of product consistency can be attributed to such items as non-uniform temperatures in the reactor, operator error, variations in the non-starch components in the feedstock, etc.

One possible method of rectifying some of these problems is to use a continuous reactor for the production of oxidized starch. A continuous reactor is well known to provide consistent quality of the product (Levenspiel, O., *Chemical Reaction Engineering, Second Edition*, John Wiley and Sons, New York, 1972. pg. 94). This consistency in the qualities of the product is due to many things, including the mixing that occurs inside the reaction vessel. However, while continuous reactors would be useful in solving some of these problems, they are not used in the production of uncooked oxidized starch. There are two primary reasons why continuous reactors are not used: a) the variation in the feedstock which causes variation in the product; and b) the different viscosity products one needs to produce for different customers. Since there is no advantage to go from a batch to a continuous system for the production of oxidized starch, no starch manufacturers produce starch in this manner.

It is important to be aware that continuous reactors are used in a few instances where the starch is simultaneously oxidized and cooked (pasted) (see, for example, U.S. Pat. No. 4,373,099). As noted above, cooking the granules causes the starch to form a viscous fluid. However, cooked starch paste is prone to spoilage by microbiological growth unless some biocide is used. In contrast, microbes do not readily attack intact starch granules, and therefore spoilage is not as severe a problem. Since the starch disclosed in U.S. Pat. No. 4,373,099 is cooked, it has to be used within a short time or the spoilage will ruin the product. Because of this, cooked starch in an aqueous form is rarely shipped. This fact impacts the value of the disclosure of U.S. Pat. No. 4,373,099 in supplying a product that can be shipped to distant customers since only those customers within a short distance from the manufacturing site can receive the cooked starch without excessive spoilage.

Finally, the literature reports that others have developed a continuous method to produce oxidized starch (U.S. Pat. No. 3,450,692). There are a number of factors that limit the application of the invention disclosed therein. The primary limitation is that the process of U.S. Pat. No. 3,450,692 uses a weak hypochlorite solution for the oxidation of starch. The concentration of hypochlorite solution disclosed in the '692 patent varies from 4.9% (8:30) to 6.44% (9:25).

In contrast, the present invention uses a hypochlorite solution of 22.9. Using a higher concentration hypochlorite solution reduces the amount of water that has to be removed in the starch drying process, thereby reducing the energy needed.

Another limitation to the process disclosed in U.S. Pat. No. 3,450,692 is that it needs multiple stages to make a single product. This is because the first stage is a low pH stage (4:75 to 5:10) followed by a high pH stage (5:11 to 45). These multiple stages require more space (tanks, etc.) and more cost than the present invention.

In summary, while U.S. Pat. No. 3,450,692 does indicate that it can be used to continuously produce oxidized starch, in practice there are a number of disadvantages which will keep it from being used.

SUMMARY OF THE INVENTION

Thus, the industry is confronted with two main problems. The first of these problems is the need in the art for a process that will be able to produce a uniform oxidized starch product from plant sources that have a variation in non-starch components. In addition to the need for a uniform starch from a varying plant source, there is a need for the same process to be capable of producing an oxidized starch with various cooked starch paste viscosities.

The present invention relates to the process of preparing oxidized starch using a continuous reactor. The process uses a single starch feedstock and can use one or multiple addition points for the oxidant. The oxidant used in the first stage can be high caustic hypochlorite described in U.S. patent application Ser. No. 09/506,746, filed Feb. 18, 2000, or can be normal hypochlorite solution which contains 4.5% free caustic. In subsequent reactor stages either the high caustic or regular caustic hypochlorite can be used.

The present invention is designed for use in the production of oxidized starch and the derivatives of oxidized starch. While the discussion presented herein focuses on the use of sodium hypochlorite as the oxidizing agent and starch obtained from corn, those skilled in the art will be able to substitute other agents and starch sources to achieve comparable results.

The present invention fulfills the need to produce an oxidized starch of any given viscosity on a continuous basis given a starting starch slurry with variable amounts of non-starch components. The oxidized starch made using the present invention produces consistent oxidized starch products that exhibit high cooked paste pH's and a reduced tendency to form amylose crystals.

DETAILED DESCRIPTION

In a preferred embodiment of the present invention, a single starch feedstock is used to produce an oxidized starch of any given viscosity using a continuous reactor with multiple stages. In the first stage, sodium hypochlorite with high concentrations of free sodium hydroxide is used to oxidize the starch. The free hydroxide concentration of the hypochlorite is between 4.5 and 10% with the preferred concentration being greater than 5% and less than 10%. Most preferred is the hydroxide concentration of approximately 9%. In second and subsequent stages, additional oxidant may be added to obtain oxidized products of lower viscosity. The oxidant used in the second and subsequent stages may be sodium hypochlorite with a free sodium hydroxide concentration anywhere between 4.5 and 10%. The higher caustic hypochlorite elevates the reaction pH, which results in a final product that, when cooked, exhibits elevated cooked paste pH's. The elevated paste pH retards amylose crystallization and thus leads to improved application performance.

EXAMPLE I

Experiments were performed to demonstrate the novel process for preparing oxidized starch using a continuous reactor. These experiments were designed to show the effect of hypochlorite solution containing 9.0% free caustic (i.e., high caustic) on the oxidation reaction and in a continuous reactor. For this set of experiments, two three-liter, constantly stirred reactors in series were used and the total time in the reactors was 5 hours. The temperature for both reactors was kept at approximately 90° F. using a water bath. For the first reactor, the hypochlorite solution was added at a rate of 15 lbs. $Cl_2$/1000 lbs. dry starch solids (dss), while in the second reactor, the addition rate was 7 lbs. $Cl_2$/1000 lbs. dss. Any residual hypochlorite in the final oxidized starch product leaving the second reactor was neutralized using a sulfite compound and the pH of the oxidized starch slurry was adjusted to pH 6.5.

The unexpected results showed if high caustic hypochlorite is used in the first reactor and regular hypochlorite (i.e. hypochlorite containing 4.5% free caustic) is used in the second, it will result in a final product having a high cooked paste pH of 6.7. In contrast, if regular hypochlorite solution is used in the first and second reactor, the product leaving the second reactor has a cooked paste pH of 5.9. This is a very significant difference in that the higher cooked paste pH will reduce the tendency to form amylose crystals in the application of the product.

EXAMPLE II

Two, one-liter, constantly stirred tank reactors in series were used with a total time of approximately 2 hours in the system. 22.9% sodium hypochlorite solution (15.5% available chorine) at 9.0% free caustic was used in the first reactor and 4.5% free caustic hypochlorite was used in the second reactor. The starch slurry was fed into the reactor containing approximately 39% solids of starch granules. The oxidation reagent (sodium hypochiorite) containing an elevated concentration of caustic (9.0% free caustic with 15 lbs. $Cl_2$/1000 lbs. dss) was added to the first reactor using an inline static mixer. Reacted starch slurry from the first reactor was fed into the second reactor at the same rate as fed into the first. Sodium hypochlorite containing 4.5% free caustic (with 7 lbs. $Cl_2$/1000 lbs. dss) was mixed with the starch from the first reactor using a second inline static mixer and then fed into the second reactor. Reacted starch slurry was withdrawn from the second reactor at the same rate as added to the second reactor. Any residual hypochlorite in the final oxidized starch product leaving the second reactor was neutralized using a sulfite compound and the pH of the oxidized starch slurry was adjusted to pH 6.5. The cooked pH of the material from the second reactor was 7.0.

EXAMPLE III

This experiment uses a 22.9% sodium hypochlorite solution (15.5% available chlorine) at 4.5% free caustic in the first and the second reactors. Two, one-liter, constantly stirred tank reactors in series were used with a total time of approximately 2 hours in the system. The starch slurry fed into the reactor containing approximately 39% solids of starch granules. The oxidation reagent (sodium hypochlorite) was fed into the first reactor using a static mixer at a rate of 15 lbs chlorine/1000 lbs dss. The oxidized starch from the first reactor was fed into the second reactor at the same rate as fed into the first. Sodium hypochlorite solution containing 4.5% free caustic was added at a rate of 7 lbs/1000 lbs dss was mixed with the product of the first reactor using a static mixer and fed into the second reactor. Reacted starch slurry was withdrawn from the second reactor as was fed into the reactor. Any residual hypochlorite in the final oxidized starch product leaving the second reactor was neutralized using a sulfite compound. The pH of the oxidized starch was adjusted to pH 6.5. The cooked pH of the material from the first and second reactors was 5.9.

When using the continuous oxidation starch reactor, a more consistent product was manufactured. Comparing the standard deviation between the continuous oxidized starch process and a batch reaction, it was found that the continuous oxidized starch had a significantly lower standard deviation (Rapid Visco Analyzer data 675 centipoise with a 121 standard deviation) than batch reacted starch made with the same starch (Rapid Visco Analyzer data 666 centipoise with a 235 standard deviation).

Please note that the use of sodium hypochlorite in the example is for illustration purposes only. One skilled in the art can use any suitable oxidant for the reaction. Furthermore, one is not limited to using two reactors, instead, one could use three or even more reactors to provide suitable product. For example, if even lower viscosity is needed, one can use either another oxidation stage or perhaps use higher amounts of sodium hypochlorite, ammonium persulfate, acid or enzyme to get the proper viscosity.

Having now fully described the present invention in some detail by way of illustration and example, for purposes of clarity and understanding, it will be obvious to one of ordinary skill in the art that the invention can be performed by modifying or changing the invention with a wide and equivalent range of conditions, formulations and other parameters thereof. Furthermore, it will be obvious to the skilled practitioner that such modifications or changes are intended to be encompassed within the scope of the appended claims. Once given the above disclosure, many other features, modification or improvements will become apparent to the skilled artisan. Such features, modifications, or improvements are therefore considered part of this invention, the scope of which can be determined by the proposed claims.

What is claimed is:

1. A method of producing oxidized starch on a continuous basis comprising
   a.) feeding a slurry of starch granules into a reactor having enough capacity to hold at least 1 hour of slurry feed on a continuous basis;
   b.) adding an oxidation reagent containing an elevated concentration of caustic to the reactor of Step a);
   c.) agitating resultant of Step b.);
   d.) withdrawing reacted starch slurry from the reactor of Step c.) at the same rate as the said starch slurry is added;
   e.) feeding a portion of said withdrawn starch slurry from Step d.) into a second reactor having enough capacity to hold at least 1 hour of said withdrawn starch slurry feed on a continuous basis;
   f.) adding an oxidation reagent to said second reactor of Step e.);
   g.) agitating said second reactor of Step f.);
   h.) withdrawing reacted starch slurry from said second reactor of Step g.) at the same rate as the said starch slurry is added; and
   i.) repeating Steps e.), f.), g.) and h.) until the oxidized starch is of desired viscosity.

2. The method of claim 1, wherein said oxidation agent is sodium hypochlorite solution.

3. The method of claim 1, wherein said elevated concentration of free caustic is between 4.5% and 10%.

4. The method of claim 1, wherein no oxidation reagent is added to the second reactor.

5. A method of producing oxidized starch on a continuous basis comprising
   a.) mixing a slurry of starch granules with an oxidation reagent containing an elevated concentration of caustic;
   b.) feeding the resultant of Step a.) into a reactor having enough capacity to hold at least 1 hour of slurry feed on a continuous basis;

c.) agitating said reactor of Step b.);

d.) withdrawing reacted starch slurry from said reactor of Step c.) at the same rate as the said starch slurry is added;

e.) feeding a portion of said withdrawn starch slurry from Step d.) into a second reactor having enough capacity to hold at least 1 hour of said withdrawn starch slurry feed on a continuous basis:

f.) adding to said second reactor of Step e.) an oxidation reagent;

g.) agitating said second reactor of Step f.);

h.) withdrawing reacted starch slurry from said second reactor of Step g.) at the same rate as the said starch slurry is added to the second reactor i.) repeating Steps e.), f.), g.), and h.) until the oxidized starch is of desired viscosity.

6. The method of claim 5, wherein said oxidation agent is sodium hypochlorite solution.

7. The method of claim 5, wherein said elevated concentration of free caustic is between 4.5% and 10%.

8. The method of claim 5, wherein no oxidation reagent is added to the second reactor.

9. The method of claim 1 and 5, wherein variation in non-starch components still produce an oxidized starch of desired viscosity.

10. The method of claim 1 and 5, wherein oxidizing agent is cooled to around 50° F. to preserve its effectiveness and reduce variation in the desired viscosity of the oxidized starch.

* * * * *